United States Patent
Subburaj et al.

(10) Patent No.: US 8,411,804 B2
(45) Date of Patent: Apr. 2, 2013

(54) DIGITAL DEMODULATION OF PULSE-WIDTH MODULATED SIGNALS

(75) Inventors: Karthik Subburaj, Bangalore (IN); Anant Shankar Kamath, Bangalore (IN); Jayawardan Janardhanan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 241 days.

(21) Appl. No.: 13/031,257

(22) Filed: Feb. 21, 2011

(65) Prior Publication Data
US 2012/0213314 A1    Aug. 23, 2012

(51) Int. Cl.
*H04L 27/06* (2006.01)
*H04L 25/06* (2006.01)
*H04L 25/10* (2006.01)
*H04L 7/00* (2006.01)

(52) U.S. Cl. ........ 375/340; 318/811; 318/727; 318/767; 318/810; 318/599; 363/21.05

(58) Field of Classification Search .................. 375/340, 375/376, 354, 371, 373; 318/811, 727, 767.807, 318/810.811, 599, 560; 363/21.05
See application file for complete search history.

(56) References Cited

U.S. PATENT DOCUMENTS

| | | | | |
|---|---|---|---|---|
| 6,094,090 A | * | 7/2000 | Yamauchi | 327/537 |
| 6,390,579 B1 | * | 5/2002 | Roylance et al. | 347/9 |
| 6,947,493 B2 | * | 9/2005 | Cohen et al. | 375/295 |

* cited by examiner

*Primary Examiner* — Sam K Ahn
*Assistant Examiner* — Mohamed A El-Rayes
(74) *Attorney, Agent, or Firm* — Ronald O. Neerings; Wade James Brady, III; Frederick J. Telecky, Jr.

(57) ABSTRACT

A digital PWM demodulator includes a first set of delay cells to receive a PWM signal and to propagate the PWM signal in a forward direction for a first interval. Delayed signals obtained at the end of the first interval are propagated in the reverse direction through the delay cells for a second interval. A logic zero feeds into the last cell at the start of the second interval. The output of a last cell in the delay cells at the end of the second interval is indicative of a data value modulated on the PWM signal. The digital PWM demodulator includes a second set of delay cells designed to operate identical to the first set of delay cells. The first set of delay cells and the second set of delay cells in conjunction with additional digital circuitry demodulate alternate periods of the PWM signal.

17 Claims, 6 Drawing Sheets

DIGITAL DEMODULATION OF PULSE-WIDTH MODULATED SIGNALS

BACKGROUND

1. Technical Field

Embodiments of the present disclosure relate generally to digital demodulation, and more specifically to digital demodulation of pulse-width modulated signals.

2. Related Art

Pulse width modulation (PWM) refers to a modulation technique in which data/information is embedded in (or represented by) the duty cycle of a signal. Successive periods of the signal may be concatenated to form a continuous stream of periods, with the duty cycle of each period representing corresponding data/information. The ratio of the ON (or high) duration of the signal to the period of the signal is termed duty cycle. A duty cycle of 50% corresponds to a situation when the ON and OFF durations of the signal are equal. Assuming the data modulated on the PWM signal is binary, a duty cycle less than 50% may be used to represent one value of the (binary) data, while a duty cycle greater than 50% may be used represent the other value of the data.

Digital demodulation of a PWM signal refers to extracting the modulated data from (each period of) the PWM signal using digital techniques and using only digital circuitry. One prior approach to PWM demodulation employs analog techniques to charge and discharge capacitors during high and low times respectively of a PWM input, followed by voltage comparisons. However, such an approach may be complex in terms of design effort and circuit layout, and may not be easily scalable with respect to frequency of the PWM signal. Another prior approach employs a counter operated with a very high speed clock, and counting the number of clock cycles contained in high and low durations of a PWM signal. Such an approach may not be desirable at least due to the need for a very high frequency clock (e.g., of the order of Giga-Hertz).

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A receiver includes multiple delay cells connected in a series arrangement, with each delay cell designed to provide a delay to a corresponding input signal. The delay cells are operable to propagate a pulse-width modulated (PWM) signal in a forward direction for a duration of a first interval to generate, at the end of the first interval, corresponding delayed signals. The delay cells are operable to propagate the corresponding delayed signals and a logic zero signal in a reverse direction for a duration of a second interval to generate, at the end of the second interval, corresponding delayed signals including a feedback signal. The feedback signal is an output of a last delay cell when the delay cells are configured in the reverse direction. The logic zero signal is an input to a first delay cell when the delay cells are configured in the reverse direction. The receiver further includes a flip-flop. The flip-flop receives the feedback signal on an asynchronous reset terminal, and the PWM signal on a clock terminal. The output of the flip-flop at the end of the second interval specifies a value of a data modulated on the PWM signal for an interval from the start of the first interval to the end of the second interval.

A method of demodulating a pulse-width modulated (PWM) signal is performed in a receiver. At the start of a first interval, multiple delay cells are configured in a first series configuration for the first interval. A PWM signal is propagated through the multiple delay cells configured in the first series configuration, and a first set of delayed signals is obtained at the end of the first interval. At the start of a second interval, the multiple delay cells are reconfigured in a second series configuration for a duration of the second interval, the second interval immediately following the first interval. The first set of delayed signals and a logic zero signal are propagated through the multiple delay cells configured in the second series configuration to generate a second set of delayed signals including a feedback signal. The feedback signal is the output of the last one of the delay cells in the second series configuration. A last one of the multiple delay cells in the first series configuration receives the logic zero signal as an input when the multiple delay cells are configured in the second series configuration. At the end of the second interval, the logic level of the feedback signal is examined. The logic level of the feedback signal specifies a data that the PWM signal is modulated by in an interval from the start of the first interval to the end of the second interval.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Environment

Figure 1:
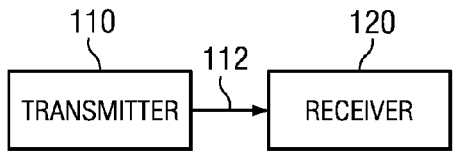
FIG. 1 is a block diagram illustrating the details of an example environment in which several embodiments can be implemented.

FIG. 1 is a block diagram illustrating the details of an example environment in which several embodiments can be implemented. FIG. 1 is shown containing transmitter 110 and receiver 120. In an embodiment, each of transmitter 110 and receiver 120 is designed to operate according to M-PHY (mobile interfaces standard) or USB3 protocol. However, transmitter 110 and receiver 120 may in general operate consistent with any other standard that uses pulse width modulation (PWM). Transmitter 110 transmits PWM signals to receiver 120 on path 112. Receiver 120 demodulates the PWM signals to extract the corresponding data values.

While the description below is provided with respect to demodulation of a single period of a PWM signal, it may be appreciated that the demodulation technique(s) can be extended without limit to demodulate each of multiple periods of the PWM signal as well. Accordingly, references herein to 'duty cycle of a PWM signal' refer in general to duty cycle of each period (periods may be adjacent/contiguous) of the PWM signal.

Figure 2A:
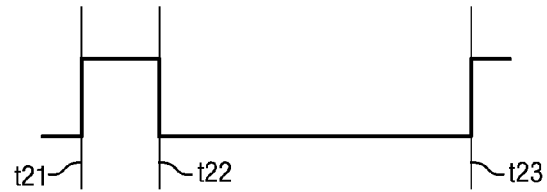
FIG. 2A is a diagram showing a PWM signal with a duty cycle less than 50%.

As noted above, the duty cycle of a PWM signal may be used to represent data values. For example, a duty cycle less than 50% may represent a binary zero. FIG. 2A shows a PWM signal with a duty cycle less than 50%. Interval t21-t23 represents one period of the PWM signal. The PWM signal is a logic high in interval t21-t22, and a logic low in interval t22-t23.

Figure 2B:
FIG. 2B is a diagram showing a PWM signal with a duty cycle greater than 50%.

A duty cycle greater than 50% may represent a binary one. FIG. 2B shows a PWM signal with a duty cycle greater than 50%. Interval t25-t27 represents one period of the PWM signal. The PWM signal is a logic high in interval t25-t26, and a logic low in interval t26-t27. The PWM signals of FIGS. 2A and 2B are each assumed to have the same period.

2. Demodulation

Figure 3:
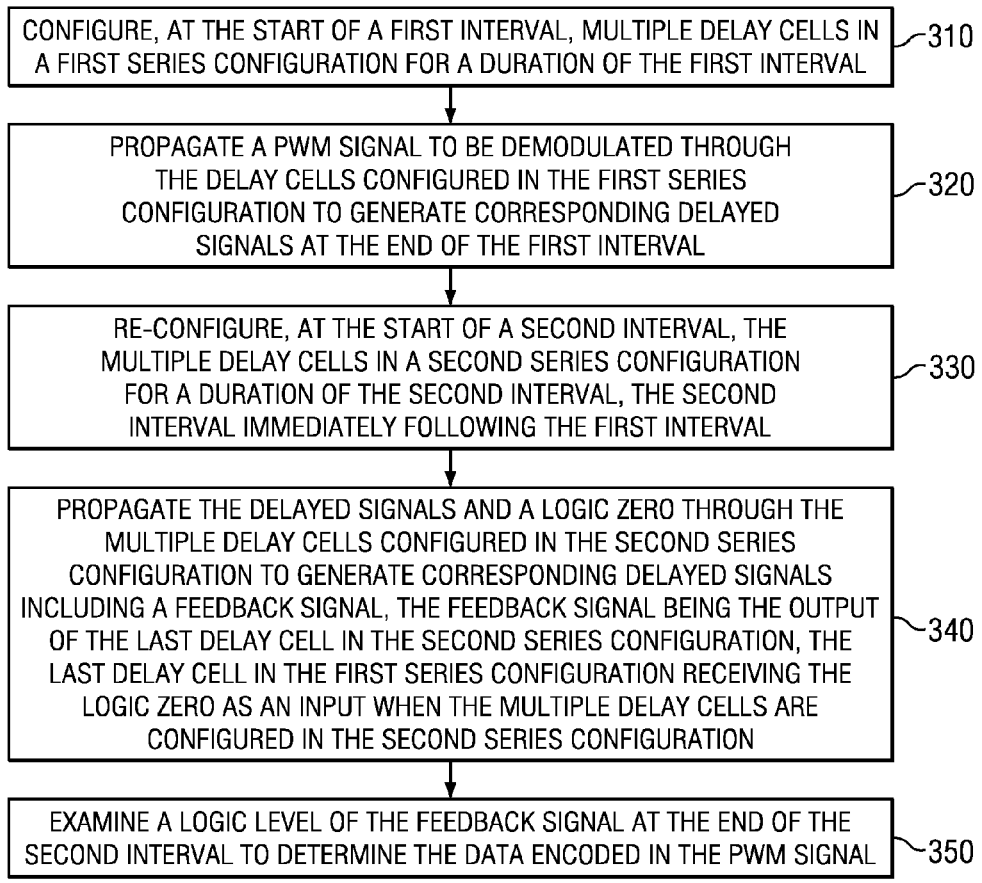
FIG. 3 is a flow diagram illustrating the manner in which a PWM signal is demodulated in an embodiment.

FIG. 3 is a flow diagram illustrating the manner in which a PWM signal is digitally demodulated in an embodiment. The flow diagram is described with respect to receiver 120 of FIG. 1, merely for illustration. However, various features described herein can be implemented in other devices and/or environments and using other components, as will be apparent to one skilled in the relevant arts by reading the disclosure provided herein. Further, the steps in the flow diagram are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein.

In step 310, at the start of a first interval, multiple delay cells in receiver 120 are configured in a first series configuration (or arrangement) for the duration of the first interval. In an embodiment, the first series configuration configures the multiple delay cells to propagate signals in a 'forward direction', as described below in detail and the first series configuration may also be viewed as a 'forward mode'. Control then passes to step 320.

In step 320, a PWM signal sought to be demodulated is provided as an input to a first cell in the multiple cells, and allowed to propagate through the delay cells configured in the first series configuration for the duration of the first interval. Each delay cell generates a corresponding delayed signal. Thus, multiple delayed signals are obtained at the end of the first interval. Control then passes to step 330.

In step 330, at the start of a second interval, the multiple delay cells are reconfigured in a second series configuration for the duration of the second interval, the second interval being an interval immediately following the first interval. In an embodiment, the second series configuration is the reverse of the first series configuration, i.e., the cells are connected in reverse order, the first cell in the first series configuration corresponding to the last cell in the second series configuration, and vice versa. Thus, in the embodiment, the second series configuration configures the multiple delay cells to propagate signals in a 'reverse direction', as described below in detail, and the second series configuration may also be viewed as a 'reverse mode'. Control then passes to step 340.

In step 340, the multiple delayed signals obtained at the end of the first interval and a logic zero signal are propagated through the multiple delay cells configured in the second series configuration to generate corresponding delayed signals including a feedback signal. The feedback signal is the output of the last delay cell in the second series configuration. The last delay cell in the first series configuration receives the logic zero signal as an input when the multiple delay cells are configured in the second series configuration. Control then passes to step 350.

In step 350, a logic level of the feedback signal is examined at the end of the second interval. The data encoded in the PWM signal is determined based on the logic level.

In an alternative embodiment, rather than examining the logic level of the feedback signal at the end of the second interval, receiver 120 checks if the logic level of the feedback signal is a logic zero prior to the occurrence of the end of the second interval. The data encoded in the PWM signal is based on the check thus made.

The steps described above are further illustrated next with respect to a digital PWM demodulation circuit.

3. Digital Circuit for PWM Demodulation

Figure 4:
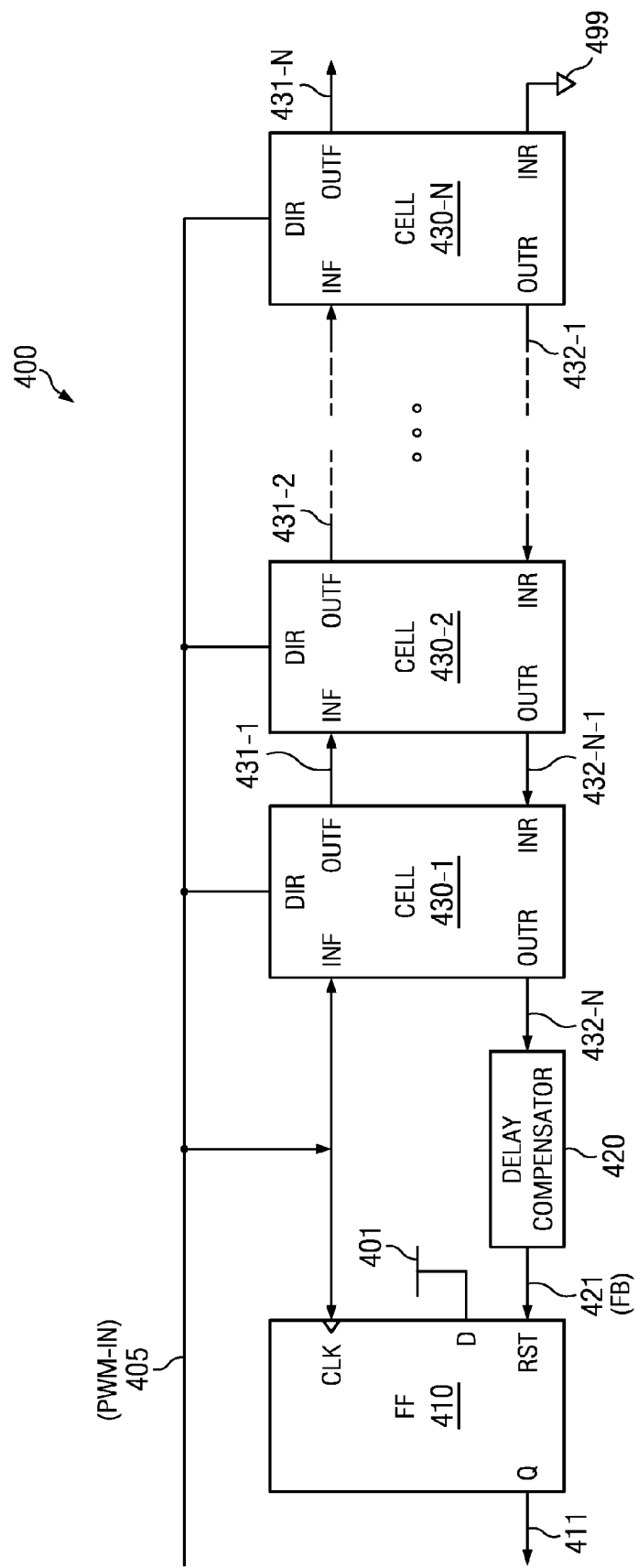
FIG. 4 is a block diagram of a digital circuit used for demodulation of PWM signals in an embodiment.

FIG. 4 is a block diagram of a digital circuit used for demodulation of PWM signals in an embodiment. PWM demodulator 400, which may be implemented within receiver 120 of FIG. 1, is shown containing cells 430-1 through 430-N, flip-flop (FF) 410 and delay compensator 420. PWM signals to be demodulated are received on path 405 (PWM-in). Each of cells 430-1 through 430-N provides a delay to a corresponding input. Terminals INF and INR represent input terminals of the cells and terminals OUTF and OUTR represent the corresponding output terminals. An input received on terminal INF is provided with a delay on output terminal OUTF. Similarly, an input received on terminal INR is provided with a delay on output terminal OUTR. The delays noted above are generally designed to be much smaller than the ON and OFF durations of the periods of the PWM signal. Terminals 401 and 499 respectively represent power and ground terminals.

Each of cells 430-1 through 430-N is configurable to operate either in a 'forward' direction or a 'reverse' direction via control of the respective DIR (direction) terminal. Propagation of signals (e.g., PWM-in) through INF and OUTF terminals of the series-connected cells may be viewed as propagation in a 'forward direction'. Thus, signal propagation through terminals (405)-(431-1)-(431-2) through (431-N) is referred to herein as propagation in a forward direction. Correspondingly, cells 430-1 through 430-N are referred to as being configured in a forward direction (first series configuration). When configured in the forward direction, propagation of signals through terminals INR and OUTR of the cells is disabled, and OUTR may simply reflect the state of OUTF (with no additional delay). When configured in the forward direction, cell 430-1 represents the 'first' cell in the series connection, while cell 430-N represents the last cell.

When configured in the 'reverse' direction, terminal OUTR of each delay cell is disconnected from its OUTF terminal, and instead OUTR is connected to INR via a delay path (internally). Therefore, a signal received at INR terminal of a delay cell is forwarded to OUTR terminal of the cell with a delay. Between cells, signals propagate from terminal OUTR of a cell to terminal INR of a next cell. For example, in the reverse direction, signal at terminal OUTR of cell 430-2 is provided as input to terminal INR of cell 430-1. As a result, the cells are connected in a reverse order. Propagation of signals from terminal OUTR of a cell to terminal INR of a next cell is referred to herein as propagation in a reverse direction. Correspondingly, cells 430-1 through 430-N are referred to as being configured in a reverse direction (second series configuration). When configured in the reverse direction, cell 430-N represents the 'first' cell in the series connection, while cell 430-1 represents the last cell.

In the embodiment illustrated in FIG. 4, the forward or reverse direction of operation of cells 430-1 through 430-N is selected by the logic level of PWM-in applied to the DIR terminals of the cells. When PWM-in is at logic high (logic one), the cells are configured to operate in the forward direct, and when PWM-in is at logic low (logic zero), the cells are configured to operate in the reverse direction.

Delay compensator 420 may be designed to provide additional delay to signal 432-N to compensate for any known systematic difference between the total delays provided by cells 430-1 through 430-N in the forward and reverse directions. Typically, any such delay difference is determined during the design and simulation stages of PWM demodulator 400. Delay compensator 420 may be implemented as a delay element. Delay compensator 420 provides signal 432-N with a delay on path 421. Signal 421 is referred to herein as a 'feedback' signal (FB).

FF 410 receives PWM-in on its clock terminal (CLK). The data (D) input of FF 410 is connected to a power supply terminal 401, and therefore is always at a logic high. The reset (RST) terminal of FF 410 is connected to signal 421. The RST input of FF 410 operates as an asynchronous clear terminal. Hence, when signal 421 is a logic high, the Q output (411) of FF 410 is set to logic zero asynchronously. However, when signal 421 is a logic low, Q output (411) is set to logic one at the rising edge of the CLK input, i.e., PWM-in. The operation of PWM demodulator 400 is now described with respect to the timing diagrams of FIG. 5 and FIG. 6.

Figure 5:
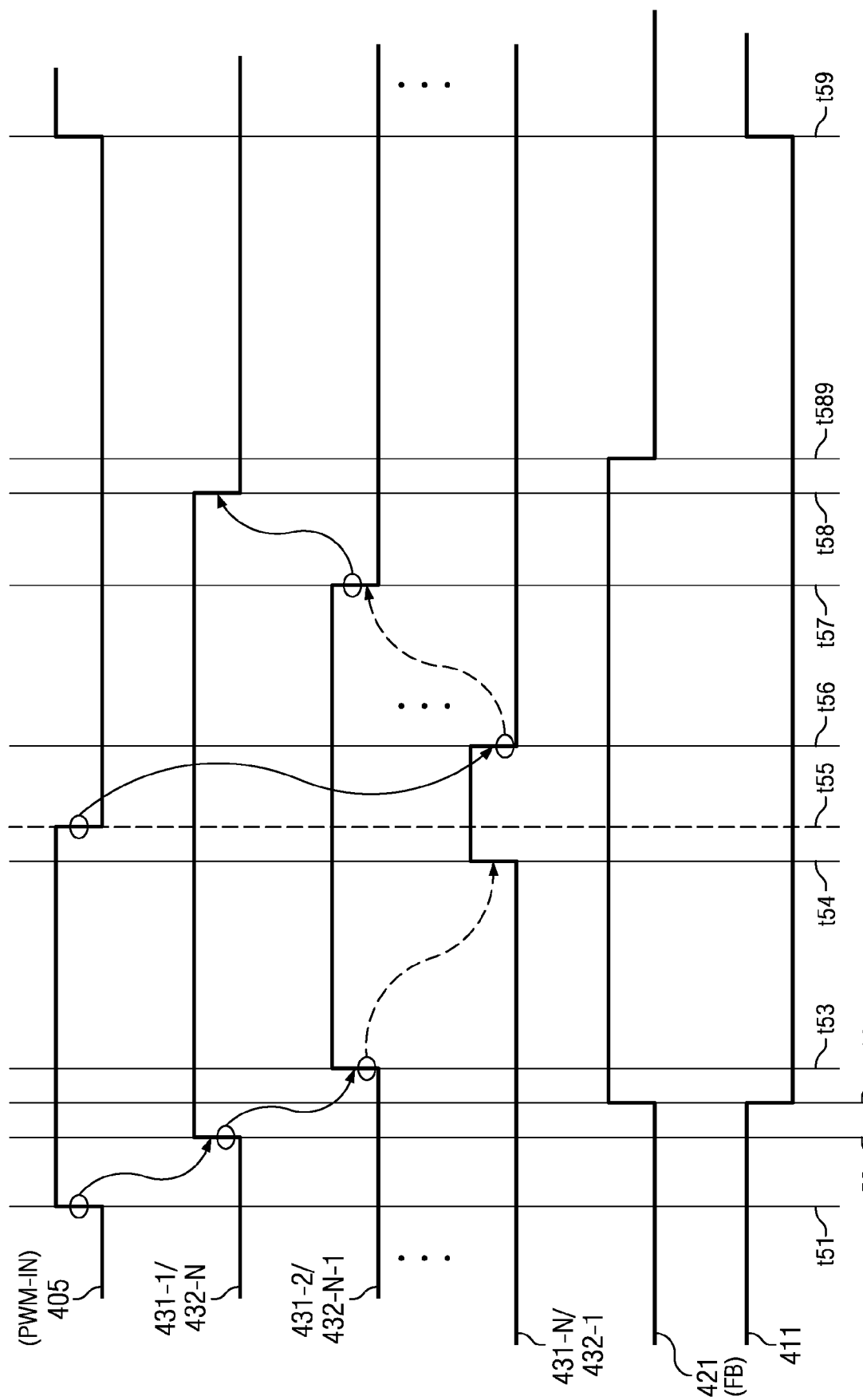
FIG. 5 is a timing diagram showing signal levels at some nodes of a PWM demodulator when a PWM signal is modulated to represent a data value of 0.

FIG. 5 shows signal levels at some nodes of PWM demodulator 400, when PWM-in (405) is modulated to represent a data value of 0. PWM-in is shown in FIG. 5 with a duty cycle less than 50%, thus representing a 0. The transition from logic low to logic high of PWM-in occurring at t51 propagates through delay cells 430-1 through 430-N in the forward direction as long as PWM-in is a logic high. Thus, signals 431-1, 431-2 and 431-N are respectively shown as transitioning to logic high at t52, t53 and t54.

As noted above, when configured in the forward direction, the signal at the OUTF terminal of a cell is also reflected (available or provided) at the OUTR terminals of the cell. Thus, till time instance t55, signal 432-N has the same logic value as signal 431-1, signal 432-N−1 has the same logic value as signal 431-2, signal 432-1 has the same logic value as signal 431-N, and so on. However, starting at t55, signal 432-N through 432-1 reflect, after corresponding delays, the respective signals at the INR terminals of the delay cells (now configured in the reverse direction). However, the OUTF and OUTR signals of respective delay cells of the circuit of FIG. 4 are denoted conveniently as OUTF/OUTR (e.g., 431-1/432-N) in FIG. 5. However, only the respective OUTR signals are valid after t55. Thus, only signals 432-N through 432-1 are valid after t55 and the corresponding signals in FIG. 5 must be read as 432N through 432-1.

PWM-in transitions to logic low at t55. Consequently, at t55, cells 430-1 through 430-N are configured to operate in the reverse direction. As a result, the INR terminal of a cell receives an input from the OUTR terminal of a 'previous cell', and provides the received input with an additional delay on its OUTR terminal. Further, the connection between the OUTF and OUTR terminals of a cell is broken. Thus for example, at t55, INR terminal of cell 430-1 receives signal 432-N−1 from OUTR terminal of cell 430-2, and so on. The INR terminal of cell 430-N, being connected to ground, receives a logic zero. Consequently, signal 432-1 (also the same as signal 431-N) is shown as transitioning to logic zero at t56 after a one-cell delay from t55. The logic low of signal 432-1 propagates through the INR and OUTR terminals of the other cells. Signal 432-N−1 at terminal OUTR of cell 430-2 is shown transitioning to logic zero at t57. Signal 432-N at terminal OUTR of cell 430-2 is shown transitioning to logic zero at t58.

Signal 421(FB) is shown as being delayed with respect to signal 431-1/432-N by a delay equal to that provided by delay compensator 420, and is shown transitioning to logic high at t523, and later to logic low at t589. Signal 421 remains a logic low through t59. Signal 411 transitions to logic low at t523. At the next rising edge t59 of PWM-in (interval t51 to t59 being equal to one period of PWM-in), signal 411 transitions to logic high. Since, signal 411 is a logic high at t59, receiver 120 concludes that PWM-in in period t51-t59 represents a data value of 0.

Figure 6:
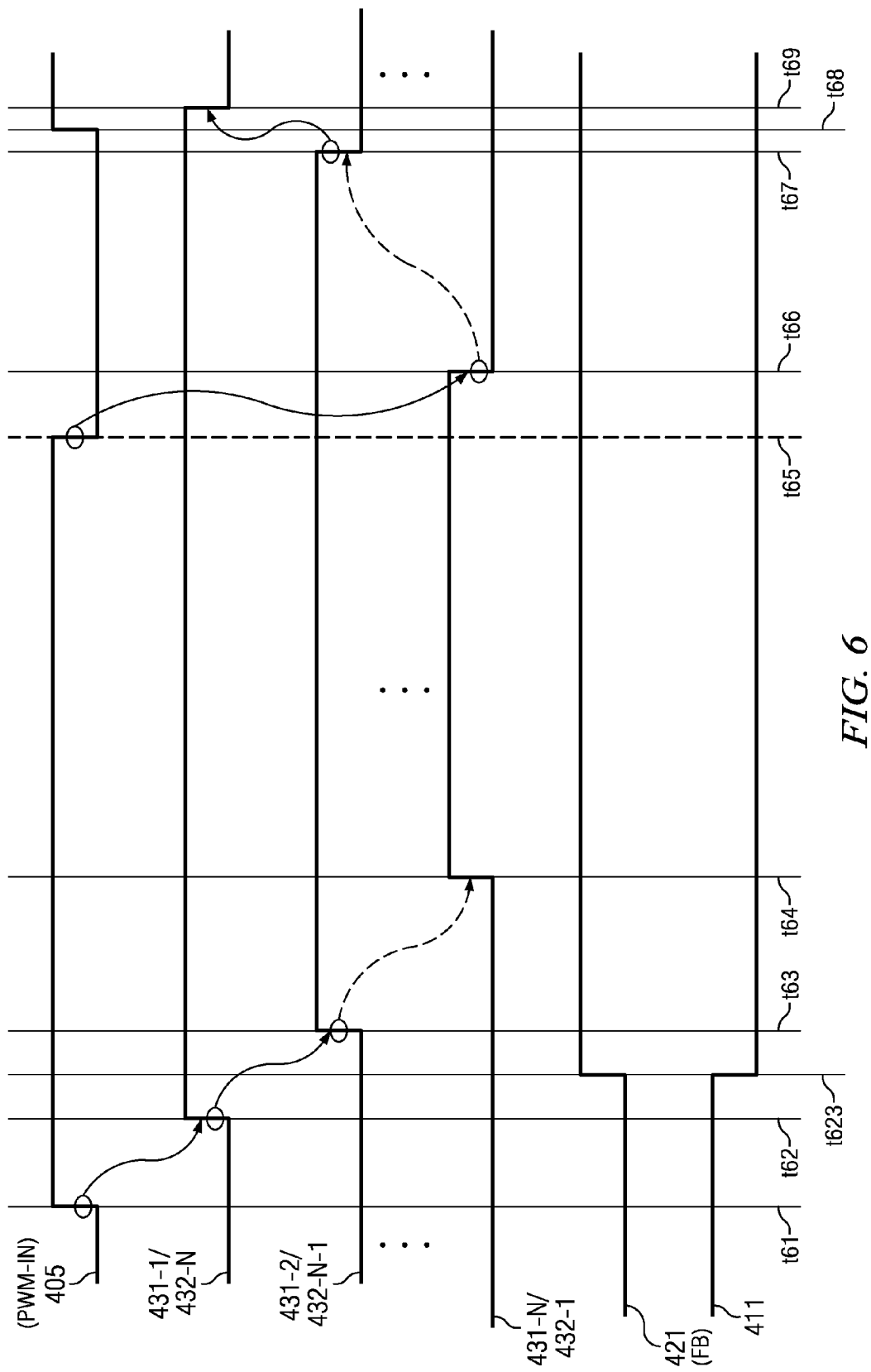
FIG. 6 is a timing diagram showing signal levels at some nodes of a PWM demodulator when a PWM signal is modulated to represent a data value of 1.

FIG. 6 shows signal levels at some nodes of PWM demodulator 400, when PWM-in (405) is modulated to represent a data value of 1. PWM-in is shown in FIG. 6 with a duty cycle greater than 50%, thus representing a 1. Again, when configured in the forward direction, the signal at the OUTF terminal of a cell is also reflected (available or provided) at the OUTR terminals of the cell. Thus, till time instance t65, signal 432-N has the same logic value as signal 431-1, signal 432-N−1 has the same logic value as signal 431-2, signal 432-1 has the same logic value as signal 431-N, and so on. However, starting at t65, signal 432-N through 432-1 reflect, after corresponding delays, the respective signals at the INR terminals of the delay cells (now configured in the reverse direction). In FIG. 6 also, the OUTF and OUTR signals of respective delay cells of the circuit of FIG. 4 are denoted as OUTF/OUTR (e.g., 431-1/432-N) for convenience. However, only the respective OUTR signals are valid after t55. Thus, only signals 432-N through 432-1 are valid after t65 and the corresponding signals in FIG. 6 must be read as 432N through 432-1.

The transition from logic low to logic high of PWM-in occurring at t61 propagates through delay cells 430-1 through 430-N in the forward direction as long as PWM-in is a logic high. Thus, signals 431-1, 431-2 and 431-N are respectively shown as transitioning to logic high at t62, t63 and t64. PWM-in transitions to logic low at t65. Consequently, at t65, cells 430-1 through 430-N are configured to operate in the reverse direction. As a result, the 'current' value (i.e., value at t65) at the OUTF terminal of each cell is provided at the OUTR terminal of the cell. In addition, the INR terminal of a cell receives an input from the OUTR terminal of a 'previous cell. To illustrate, at t65, signal 431-1 is internally (within cell 430-1) routed onto path 432-N. INR terminal of cell 430-1 receives an input from OUTR terminal of cell 430-2, and so on. The INR terminal of cell 430-N, being connected to ground, receives a logic zero. Consequently, signal 432-1 (also the same as signal 431-N) is shown as transitioning to logic zero at t66 after a one-cell delay from t65.

The logic low of signal 432-1 propagates through the INR and OUTR terminals of the other cells. Signal 432-N−1 at terminal OUTR of cell 430-2 is shown transitioning to logic zero at t67. Signal 432-N at terminal OUTR of cell 430-2 is shown transitioning to logic zero at t69.

Signal 421 (FB) is shown as being delayed with respect to signal 431-1/432-N by a delay equal to that provided by delay compensator 420, and is shown transitioning to logic high at t623. Signal 421 (FB) remains a logic high through t68. Signal 411 transitions to logic low at t623, and remains a logic low through t68. Interval t61 to t68 equals one period of PWM-in. Since, signal 411 is a low at t68, receiver 120 concludes that PWM-in in period t61-t68 represents a data value of 1.

The number 'N' of delay cells (430-1 through 430-N) as well as the delay provided by a delay cell (in the forward as well as reverse directions) are implemented such that the total delay in the forward direction (total forward path delay) is more than the longest ON time of PWM-in. Similarly, the total delay in the reverse direction (total reverse path delay) is ensured to be more than the longest OFF time of PWM-in. The longest ON time and the longest OFF time are known a priori from the protocol or standard according to which PWM-in is generated and receiver 120 and transmitter 110 are designed to conform to. Further, the delay provided by each delay cell is designed to be much smaller than the ON and OFF times of PWM-in. In addition, the delay provided by a cell in the forward direction is designed ideally to equal the delay provided by the cell in the reverse direction. Total mismatch (if any) between the total delay in the forward direction and the total delay in the reverse direction may be designed to be smaller than the smallest possible difference between ON and OFF times of PWM-in. Again, the smallest possible difference between ON and OFF times of PWM-in signal is typically known a priori from the corresponding standard/protocol. As a result, it is ensured that signal 421 is a logic one at the next rising edge of PWM-in (i.e., at the end of the period of PWM-in) when PWM-in is modulated by a data value of 0, and is a logic zero at the end of the period of PWM-in when PWM-in is modulated by a data value of 1. Thus, by examining the value of signal 411 at the end of the corresponding period of PWMN-in, receiver 120 can determine the value of the data value modulated on PWM-in in the period.

Figure 7:
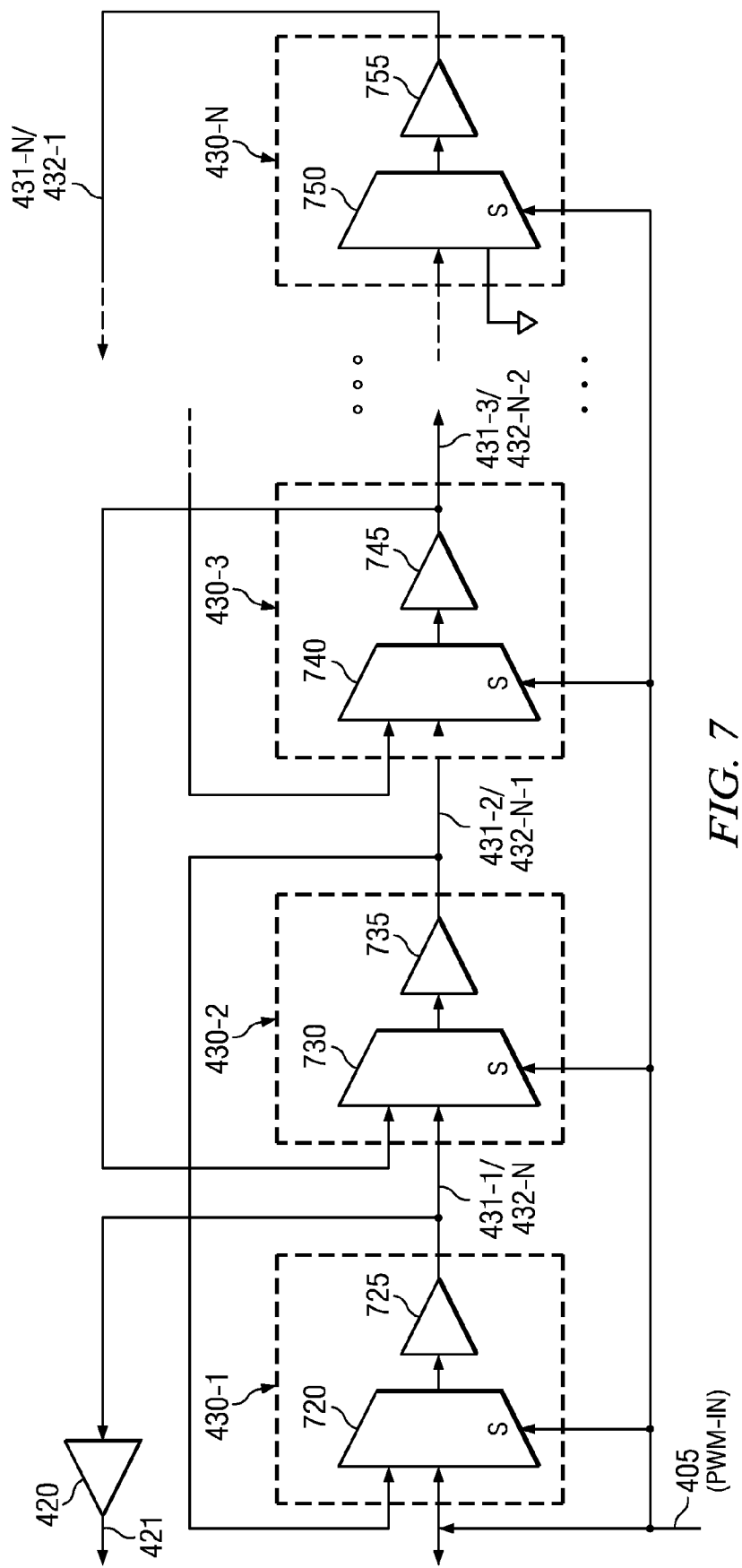
FIG. 7 is a block diagram illustrating the implementation details of delay cells used in a PWM demodulator, in an embodiment.

FIG. 7 is a diagram illustrating the implementation details of delay cells of PWM demodulator 400, in an embodiment. In the embodiment, each of delay cells 430-1 through 430-N includes a multiplexer (MUX) and a delay element. Thus, delay cell 430-1 is shown containing MUX 720 and delay element 725, delay cell 430-2 is shown containing MUX 730 and delay element 735, delay cell 430-3 (not shown in FIG. 4, but contained in the set of delay cells (430-1 through 430-N) is shown containing MUX 740 and delay element 745, while delay cell 430-N is shown containing MUX 750 and delay element 755. Delay compensator 420 is shown implemented as delay element 420.

Each of the multiplexers in the delay cells of PWM demodulator 400 receives two input signals, and forwards one of the two as the output signal based on the logic level of the select input, labeled in FIG. 7 as 'S'. The delay element in each delay cell provides a delay to the signal received as input. The delay provided by the MUX of a delay cell is designed to be negligible compared to the delay provided by the delay element of the delay cell. Further, signal-rise and signal-fall delays of the cell are designed to be as nearly equal to each other as possible.

When the delay cells are configured to operate in the forward direction (PWM-in is a logic high), MUX 720 provides PWM-in as its output to delay element 725. Similarly, MUX 730 provides signal 431-1/432-N as its output to delay element 735, and so on. MUX 750 provides the output of the delay element of the previous delay cell in the connection as an input to delay element 755.

When configured in the reverse direction (PWM-in is a logic low), MUX 720 provides signal 431-2/432-N−1 as its output to delay element 725. Similarly, MUX 730 provides signal 431-3/432-N−2 as its output to delay element 735, and so on. MUX 750 provides a logic low (due to the ground connection) as an input to delay element 755.

Referring again to FIG. 6, it may be observed that signal 431-1/432-N is at logic one even after the commencement (at t68) of the next period of PWM-in. Depending on the specific number of delay cells in PWM demodulator 400 and/or the delay of each cell and/or the specific duty cycle of PWM-in that represents a data value of 1, one or more of the other signals such as 431-2/432-N−1 may also be at logic one even after t68. As a result, the operation of PWM demodulator 400 may be erroneous. It may, therefore, be necessary that the outputs of all delay cells all be at logic low at the start of the next period of PWM-in. Hence in an embodiment, two sets of delay cells are used alternately to process corresponding alternate periods of PWM-in.

Figure 8:
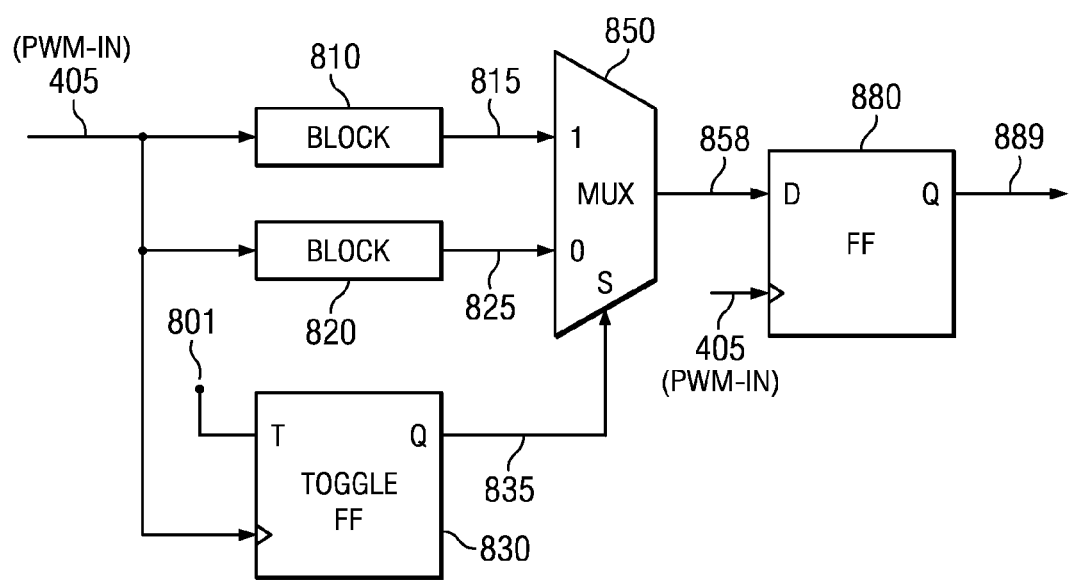
FIG. 8 is a block diagram illustrating the details of a PWM demodulator in which alternate periods of a PWM signal are demodulated by separate circuits.

FIG. 8 is a block diagram illustrating the details of a PWM demodulator in which alternate periods of PWM-in are demodulated by separate circuits/blocks. The diagram is shown containing blocks 810 and 820, multiplexer (MUX) 850, toggle flip-flop (FF) 830 and D flip-flop (FF) 880. Each of blocks 810 and 820 is implemented identical to PWM demodulator 400 of FIG. 4. Each of signals 815 and 825 correspond to signal 411 of FIG. 4, except that only one of signals 815 and 825 is valid in any period of PWM-in, the valid signal being selected by MUX 850 and provided as output 858.

MUX 850 forwards on path 858 one of signals 815 and 825 depending on the value of binary signal 835. Toggle FF 830 toggles its Q output between a logic one and a logic zero every period of PWM-in. Terminal 801 is connected to a power supply, and the toggle (T) input of FF 830 is a permanently connected to logic one. Output 858 of MUX 850 is provided as the D input of FF 880, which is clocked by PWM-in. Output 889 specifies the data value modulated on PWM-in, and is a logic high when the data value is a 0, and a logic low when the data value is a 1. Each of blocks 810 and 820 is implemented similar to PWM demodulator 400 of FIG. 4 and receives the same inputs. Block 810 and block 820 demodulate alternate periods of PWM-in, with the corresponding output (815 or 825) being forwarded by MUX 859 as noted above. The manner of demodulation is as described in detail above.

Outputs of all delay cells in block 810 need to be zero prior to commencement of a PWM-in period which is to be demodulated by block 810. Similarly, outputs of all delay cells in block 820 need to be zero prior to commencement of a PWM-in period which is to be demodulated by block 820. When PWM-in is modulated by a data value of 0, the outputs of all delay cells (whether in block 810 or 820) would automatically (in operation) become logic zero prior to the end of the period of PWM-in as may be observed from FIG. 5.

When PWM-in is modulated by a data value of 1, outputs of one or more delay cells (in the block 'currently' demodulating a 'current' period (P) of PWM-in) may continue to be non-zero into the next period (P+1) of PWM-in. In period (P+1), the outputs of all cells of the block that demodulated period P of PWM-in are forced to logic zero. In an embodiment, toggle signal 835 may be used to "reset" (to logic zero) all cells of block 810 (820) when block 820 (810) is in use. Although not shown in the Figures, each delay cell may be designed with a "reset" control input, which when receives a reset signal, forces the output of the cell to logic zero independent of the data input to the cell. Such reset operation may be implemented in a known way. As an example, the delay elements of a delay cell may each be implemented as a two-input AND gate, with the data input and active low reset (i.e., reset occurs when the reset signal is a logic low) as inputs.

While the description above was provided with respect to demodulation of a PWM signal modulated by binary data, similar techniques can be extended to demodulate PWM signals modulated by non-binary data as well. Duty cycle ranges can be used to map to three, four or more data values. As an example, duty cycles less than 25% may be used to represent 0, duty cycles between 25% and 50% may be used to represent 1, duty cycles between 50% and 75% may be used to represent 2, and duty cycles between 75% and 100% may be used to represent 3. Decoding the specific data value may be based, for example, on the specific time instance (with respect to the PWM signal edge) at which the feedback signal changes from logic one to logic zero. More complex logic could be implemented to examine outputs of multiple delay cells in the chain (rather than just one output, namely, feedback signal 421 of FIG. 4) and PWM-in.

While in the illustrations of FIGS. 4, 7 and 8, although terminals/nodes are shown with direct connections to various other terminals, it should be appreciated that additional components (as suited for the specific environment) may also be present in the path, and accordingly the connections may be viewed as being electrically coupled to the same connected terminals. In the instant application, power and ground terminals are referred to as constant reference potentials.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A receiver comprising:
a first plurality of delay cells coupled in a series arrangement,
wherein each delay cell in the first plurality of delay cells is designed to provide a corresponding delay to a corresponding input signal, the first plurality of delay cells operable to propagate a pulse-width modulated (PWM) signal in a forward direction for a duration of a first interval to generate, at the end of the first interval, a first plurality of delayed signals,
wherein the first plurality of delay cells is operable to propagate the first plurality of delayed signals and a logic zero signal in a reverse direction for a duration of a second interval to generate, at the end of the second interval, a second plurality of delayed signals including a feedback signal,
wherein the feedback signal is an output of a last delay cell when the first plurality of delay cells is configured in the reverse direction,
wherein the logic zero signal is an input to a first delay cell in the series arrangement when the first plurality of delay cells is configured in the reverse direction; and
a first flip-flop coupled to receive the feedback signal on a reset terminal, the first flip-flop being coupled to receive the PWM signal on a clock terminal,
wherein an output of the first flip-flop at the end of the second interval specifies a value of a data modulated on the PWM signal for an interval from the start of the first interval to the end of the second interval.

2. The receiver of claim 1, wherein the first interval equals an interval between a rising edge of the PWM signal and an immediately next falling edge of the PWM signal, and wherein the second interval equals an interval between the immediately next falling edge and an immediately next rising edge of the PWM signal.

3. The receiver of claim 1, wherein a data of value zero is represented by modulating the PWM signal with a duty cycle less than 50%, and a data of value one is represented by modulating the PWM signal with a duty cycle greater than 50%.

4. The receiver of claim 1, further comprising a delay compensator to delay the feedback signal by a delay, and to provide a delayed feedback signal to the reset terminal of the first flip-flop.

5. The receiver of claim 1, further comprising a second plurality of delay cells and a second flip-flop, wherein the second plurality of delay cells and the second flip-flop are designed to operate identical to the first plurality of delay cells and the first flip-flop respectively,
wherein the combination of the first plurality of delay cells and the first flip-flop and the combination of the second plurality of delay cells and the second flip-flop are operable to demodulate alternate periods of the PWM signal.

6. The receiver of claim 5, wherein a logic level of the PWM signal configures each of the first plurality of delay cells and the second plurality of delay cells in the forward direction as well and the reverse direction, the receiver further comprising:
a multiplexer (MUX) to forward one of the output of the first flip-flop and an output of the second flip-flop as a MUX output;
a toggle flip-flop coupled to receive the PWM signal on a clock terminal of the toggle flip-flop, and to generate a toggle output, wherein the toggle output toggles between a logic zero and a logic one for alternate periods of the PWM signal,
wherein the MUX output is selected based on the logic level of the toggle output.

7. The receiver of claim 1, wherein a logic one value of the output of the first flip-flop specifies that the value of the data modulated on the PWM signal is zero, and wherein a logic zero value of the output of the first flip-flop specifies that the value of the data modulated on the PWM signal is one.

8. The receiver of claim 1, wherein the PWM signal is generated according to one of the M-PHY and the USB3 protocol.

9. The receiver of claim 1, wherein the first delay cell in the series arrangement when the first plurality of delay cells is configured in the reverse direction is a last delay cell in the series arrangement when the first plurality of delay cells is configured in the forward direction, and
wherein the last delay cell when the first plurality of delay cells is configured in the reverse direction is a first delay cell in the series arrangement when the first plurality of delay cells is configured in the forward direction.

10. The receiver of claim 9, wherein each of the first plurality of delay cells comprises a multiplexer (MUX) and a delay element.

11. The receiver of claim 10, wherein a MUX of a delay cell (N) in the plurality of delay cells is coupled to receive a first input and a second input, the MUX providing one of the first input and the second input as a MUX output based on the value of a select input, wherein the select input is the PWM signal, wherein N is an integer.

12. The receiver of claim 11, wherein if the delay cell (N) is the first delay cell in the series arrangement when the first plurality of delay cells is configured in the forward direction, the first input receives the PWM signal, the second input receives an output of a next delay cell in the series arrangement, and the MUX output is provided as an input to the delay element in the delay cell (N), wherein an output of the delay element in the delay cell (N) is the feedback signal.

13. The receiver of claim 12, wherein if the delay cell (N) is the last delay cell in the series arrangement when the first plurality of delay cells is configured in the forward direction, the first input receives an output of a delay element in a previous cell, the second input receives the logic zero signal, and the MUX output is provided as an input to the delay element in the delay cell (N).

14. A method of demodulating a pulse-width modulated (PWM) signal, the method being performed in a receiver, the method comprising:

configuring, at the start of a first interval, a plurality of delay cells in a first series configuration for a duration of the first interval;

propagating the PWM signal through the plurality of delay cells configured in the first series configuration, wherein the propagating generates a first plurality of delayed signals at the end of the first interval;

reconfiguring, at the start of a second interval, the plurality of delay cells in a second series configuration for a duration of the second interval, wherein the second interval immediately follows the first interval;

propagating the first plurality of delayed signals and a logic zero signal through the plurality of delay cells configured in the second series configuration to generate a second plurality of delayed signals including a feedback signal, the feedback signal being the output of the last one of the delay cells in the second series configuration, wherein a last one of the delay cells in the first series configuration receives the logic zero signal as an input when the plurality of delay cells is configured in the second series configuration; and examining, at the end of the second interval, a logic level of the feedback signal, wherein a logic level of the feedback signal determined by the examining specifies a data that the PWM signal is modulated by in an interval from the start of the first interval to the end of the second interval.

15. The method of claim 14, wherein the first interval equals an interval between a rising edge of the PWM signal and an immediately next falling edge of the PWM signal, and wherein the second interval equals an interval between the immediately next falling edge and an immediately next rising edge of the PWM signal.

16. The method of claim 15, wherein the first series configuration enables the plurality of delay cells to propagate the PWM signal in a forward direction to generate the first plurality of delayed signals, and wherein the second series configuration enables the plurality of delay cells to propagate the first plurality of delayed signals and the logic zero signal in a reverse direction.

17. The method of claim 16, wherein the configuring, the propagating the PWM signal through the plurality of delay cells configured in the first series configuration, the reconfiguring, the propagating the first plurality of delayed signals and a logic zero signal through the plurality of delay cells configured in the second series configuration, and the examining are performed alternately in separate sets of circuits in the receiver to demodulate alternate periods of the PWM signal.

* * * * *